United States Patent
Benthien et al.

(10) Patent No.: US 12,454,974 B2
(45) Date of Patent: Oct. 28, 2025

(54) COUPLING KIT-OF-PARTS FOR A MOUNTING ARRANGEMENT FOR MOUNTING AN INTERIOR SUBSTRUCTURE TO A PRIMARY STRUCTURE OF AN AIRCRAFT

(71) Applicant: Airbus Operations GmbH, Hamburg (DE)

(72) Inventors: Hermann Benthien, Hamburg (DE); Amarnath Pise, Karnataka (IN)

(73) Assignee: Airbus Operations GmbH, Hamburg (DE)

( * ) Notice: Subject to any disclaimer, the term of this patent is extended or adjusted under 35 U.S.C. 154(b) by 291 days.

(21) Appl. No.: 18/354,898

(22) Filed: Jul. 19, 2023

(65) Prior Publication Data
US 2024/0026913 A1   Jan. 25, 2024

(30) Foreign Application Priority Data
Jul. 21, 2022   (IN) .............................. 202211041860

(51) Int. Cl.
*F16B 13/12*   (2006.01)
*F16B 13/06*   (2006.01)

(52) U.S. Cl.
CPC .......... *F16B 13/126* (2013.01); *F16B 13/063* (2013.01)

(58) Field of Classification Search
CPC .. F16B 13/063; F16B 13/068; F16B 13/0816; F16B 13/126; F16B 13/128
USPC ....................................................... 403/277
See application file for complete search history.

(56) References Cited

U.S. PATENT DOCUMENTS

| | | | | |
|---|---|---|---|---|
| 100,055 A | * | 2/1870 | Montgomery ...... | F16B 13/0816 411/456 |
| 1,848,142 A | * | 3/1932 | Peirce .................... | F16B 13/126 411/64 |
| 3,832,931 A | * | 9/1974 | Talan .................... | F16B 13/126 411/72 |
| 4,427,327 A | * | 1/1984 | Herb .................... | F16B 13/0816 411/79 |
| 4,884,931 A | * | 12/1989 | Revol .................... | F16B 13/063 248/231.91 |
| 5,221,167 A | * | 6/1993 | Girkin .................... | F16B 13/126 411/271 |

(Continued)

FOREIGN PATENT DOCUMENTS

| DE | 20104307 U1 | 9/2001 |
|---|---|---|
| DE | 102020128089 A1 | 4/2022 |

(Continued)

OTHER PUBLICATIONS

European Search Report for corresponding European Patent Application No. 23186334 dated Dec. 19, 2023; priority document.

*Primary Examiner* — Jeffrey O'Brien
(74) *Attorney, Agent, or Firm* — Greer, Burns & Crain, Ltd.

(57) ABSTRACT

A coupling kit-of-parts is provided for mounting an interior substructure to a primary structure of an aircraft. The kit includes a locking member and a mounting member. When the locking member is inserted into the mounting member, a first member part and a second member part are pushed radially outward to engage the primary structure in a form-fitting manner. When the locking member is removed, the first and second member parts are urged radially inward thereby disengaging from the primary structure.

16 Claims, 8 Drawing Sheets

(56) References Cited

U.S. PATENT DOCUMENTS

| | | | | |
|---|---|---|---|---|
| 5,259,689 | A * | 11/1993 | Arand | F16D 1/033 |
| | | | | 403/337 |
| 6,004,085 | A * | 12/1999 | Yamamoto | F16B 13/126 |
| | | | | 411/60.1 |
| 6,454,503 | B1 * | 9/2002 | Polic | F16B 19/1081 |
| | | | | 24/324 |
| 6,474,920 | B2 * | 11/2002 | Lin | F16B 35/02 |
| | | | | 411/45 |
| 6,749,385 | B2 * | 6/2004 | Yeh | F16B 13/126 |
| | | | | 411/60.1 |
| 6,991,413 | B2 * | 1/2006 | Ballou | F16B 13/063 |
| | | | | 411/57.1 |
| 7,837,408 | B2 * | 11/2010 | Hawang | F16B 13/126 |
| | | | | 403/243 |
| 7,942,601 | B2 | 5/2011 | Bohman et al. | |
| 8,246,282 | B2 * | 8/2012 | Hung | F16B 15/04 |
| | | | | 411/448 |
| 10,378,198 | B2 | 8/2019 | Benthien et al. | |
| 10,533,597 | B2 * | 1/2020 | Benthien | F16B 37/085 |
| 11,193,517 | B2 * | 12/2021 | McClure | F16B 19/1081 |
| 11,492,142 | B2 * | 11/2022 | Benthien | B64F 5/50 |
| 11,549,538 | B2 * | 1/2023 | Hill | F16B 5/01 |
| 11,781,579 | B1 * | 10/2023 | Strange | F16B 19/02 |
| | | | | 411/80.1 |

FOREIGN PATENT DOCUMENTS

| | | |
|---|---|---|
| EP | 3135833 A1 | 3/2017 |
| EP | 3254951 A1 | 12/2017 |
| EP | 3254967 A1 | 12/2017 |
| EP | 3744634 A1 | 12/2020 |
| WO | 2006137759 A1 | 12/2006 |

* cited by examiner

COUPLING KIT-OF-PARTS FOR A MOUNTING ARRANGEMENT FOR MOUNTING AN INTERIOR SUBSTRUCTURE TO A PRIMARY STRUCTURE OF AN AIRCRAFT

CROSS-REFERENCES TO RELATED APPLICATIONS

This application claims the benefit of the Indian patent application No. 202211041860 filed on Jul. 21, 2022, the entire disclosures of which are incorporated herein by way of reference.

FIELD OF THE INVENTION

The invention relates to a kit-of-parts for a mounting arrangement. Furthermore, the invention relates to a mounting arrangement for mounting an interior substructure to a primary structure of an aircraft. Still further, the invention relates to an aircraft cabin and an aircraft equipped with said mounting arrangement.

BACKGROUND OF THE INVENTION

The importance of automation is ever increasing, specifically in the field of aircraft manufacturing. Many tasks are still performed manually. Some manufacturing steps, such as the manufacturing of wings, fuselage parts, and the like already enjoy a certain degree of automation. However, the assembly of the cabin interior still requires many man-hours until completion.

EP 3 135 833 A1 discloses a rotary joint that comprises a socket rod with a basically spheroid concave bearing surface. A housing nut encircles the socket rod and has a threaded wrenching head. A ball rod has a basically spheroid convex bearing surface and threaded side walls around the bearing surface. The socket rod is swivably supported relative to the ball rod.

EP 3 254 967 A1 discloses an interior component for an aircraft. The interior component comprises a wall being connected to an interior component carrier system. The wall has an indentation directed towards a cabin of the aircraft, and the indentation has a shape corresponding to at least part of the interior component carrier system.

EP 3 254 951 A1 discloses a fixation assembly for affixing a first object to and variably spaced from a second object. A male fastener comprises a bolt-shaped part having a circumferential outer surface, wherein the circumferential outer surface includes alternately at least one ridged section and at least one plain section. A female fastener comprises a circumferential inner surface including alternately at least one ridged section and at least one plain section. The male fastener is inserted into the female fastener. When the ridged section coincides with the plain section of the female fastener, the respective ridges of the ridged sections of the male fastener and the female fastener engage each other after a relative rotation of male and female fastener.

WO 2006/0 137 759 A1 discloses a coupling device to be connected to a corner fitting of a container.

EP 3 744 634 A1 discloses a tolerance compensation subassembly in the form of a tolerance compensation element. The tolerance compensation subassembly contains an actuator which is formed from an electro-active polymer. The tolerance compensation subassembly is electrically switchable between a fixed state and a non-fixed state.

DE 10 2020 128 089 A1 discloses a positioning bushing. The bushing is used to set a distance and an orientation between two aircraft components. The positioning bushing comprises an outer bushing which is inserted into a first aircraft component and an inner bushing which is inserted into the outer bushing. The inner bushing accommodates a second aircraft component or conventional fastener. The outer bushing and the inner bushing are designed such that when the inner bushing is inserted into the outer bushing, rotation of the inner bushing relative to the outer bushing is blocked. The positioning bushing is used in aircraft mounting arrangements. In particular, the positioning bushing is used when connecting parts of the aircraft structure, such as the primary structure or the secondary structure.

SUMMARY OF THE INVENTION

It is an object of the invention to provide measures which improve automation in the mounting of interior components to the aircraft primary structure.

The invention provides a coupling kit-of-parts for a mounting arrangement that is configured for mounting an interior substructure to a primary structure of an aircraft, the kit-of-parts comprising:
 a locking member; and
 a mounting member including a first member part and a second member part that are movably supported by a common support member,
 wherein the first and second member parts form a locking channel therebetween that is configured to receive the locking member,
 wherein the mounting member is configured such that, when the locking member is inserted into the locking channel, the first and second member parts are pushed radially outward by the locking member, preferably along opposing radial directions.

Preferably, the kit-of-parts further comprises an elastic member that is arranged to urge the first and second member parts radially inward along the radial direction such that, when the locking member is removed from the locking channel, the first and second member parts are pushed radially inward by the elastic member, preferably along opposing radial directions.

Preferably, the support member includes a guiding recess that is configured to guide the first and second member parts along the radial direction.

Preferably, the first member part and/or the second member part include a head portion that engages the support member, preferably the guiding recess, in a sliding manner.

Preferably, the head portion includes a head support portion that engages the support member, preferably the guiding recess, in a sliding manner. Preferably, the head portion includes a head recessed portion that is configured such that the head recessed portion engages the support member at an inner circumferential surface, when the locking member is inserted in the locking channel. Preferably, the head portion includes a head recessed portion that is configured such that the head recessed portion is disengaged from the support member, when the locking member is removed from the locking channel.

Preferably, the support member includes a support opening, and the first and second member parts are partially inserted in the support opening. Preferably, the head portion is arranged within the support opening. Preferably, the guiding recess is formed in an inner circumferential surface of the support opening.

Preferably, the first member part and/or the second member part include an engagement surface that is configured to engage a structure interface bushing in a form-fitting manner. Preferably, the engagement surface is formed on a radially outward facing surface. Preferably, the engagement surface comprises a plurality of engagement ridges.

Preferably, the first member part and/or the second member part include a shank portion and the engagement surface is formed on the shank portion. Preferably, the shank portion is formed adjacent to the head portion. Preferably, the shank portion is arranged outside the support member, preferably outside the support opening.

Preferably, the locking channel comprises a tapered channel entrance portion and a channel portion that matches the locking member. Preferably, when the locking member is inserted past the channel entrance portion, the first and second member parts are radially moved apart, and the channel portion is supported on the locking member.

Preferably, the first member part and/or the second member part include a mounting member end portion that comprises an outward facing tapered surface.

Preferably, the kit-of-parts further comprises a retaining bushing that is inserted in the support member and retains the locking member in a manner that requires overcoming a mechanical resistance, when removing the locking member from the support member, preferably from the locking channel. Preferably, the retaining bushing includes a detent member that engages the locking member, when inserted in the support member.

Preferably, the locking member extends in a longitudinal direction. Preferably, the locking member comprises a locking member head portion and a locking member end portion. Preferably, the head portion includes a head tapered portion that is configured to interact with the support member and/or the retaining bushing, preferably the detent member, such that the locking member is removable from the locking channel against a resistance due to that interaction.

Preferably, the locking member end portion includes a retaining portion and a tapered end portion, wherein the retaining portion is configured to interact with the support member and/or the retaining bushing, preferably the detent member, such that, when the locking member is removed from the locking channel but still inside the support member, the tapered portion is arranged adjacent to or in contact with the mounting member.

Preferably, the retaining portion is arranged closer to the locking member head portion than the tapered end portion.

Preferably, the kit-of-parts further comprises a structure interface bushing that is configured to get engaged by the radially pushed first and second member parts, when the locking member is inserted in the locking channel, such that the mounting member is affixed to the structure interface bushing.

The invention provides a mounting arrangement for mounting an interior substructure to a primary structure of an aircraft, the arrangement comprising:
 a primary structure portion;
 an interior substructure member that has a substructure mounting opening configured for mounting the interior substructure to the primary structure portion;
 a preferred coupling kit-of-parts as previously described, wherein the structure interface bushing is affixed to the primary structure portion, wherein the mounting member is inserted in the mounting opening such that the support member is arranged in a manner that prevents the interior substructure from being removed from the mounting member.

Preferably, the elastic member is arranged between the structure interface bushing and the support member. Preferably, the elastic member is arranged closer to the support member or in contact with the support member.

Preferably, the first member part and/or the second member part include an engagement surface that engages the structure interface bushing in a form-fitting manner, when the locking member is inserted in the locking channel.

Preferably, the first member part and/or the second member part include a shank portion that is at least partially inserted in the structure interface bushing.

The invention provides an aircraft cabin or a cargo hold comprising an interior component, an interior substructure, and a preferred mounting arrangement as previously described, wherein the interior substructure member is part of the interior substructure, wherein the cabin component is mounted to the interior substructure and the interior substructure is mounted to the primary structure portion by the mounting arrangement.

The invention provides an aircraft comprising a preferred aircraft cabin.

Typically, individual customer requirements regarding the cabin interior are considered by having some kind of substructure that can be mounted to the standardized primary structure. The individual customer equipment is mounted to the substructure. The substructure therefore should perform several functions simultaneously. The substructure should fulfil structural requirements, such as stiffness, toughness, etc. Furthermore, the substructure should be able to compensate for manufacturing tolerances in both the primary structure and the interior cabin component.

An example for a cabin component is the cabin crown module that is attached at the top of the aircraft cabin. In a typical manner, the cabin crown module may include hatracks, overhead compartments, lighting devices, etc. Further examples may include interior cabin panels, floor boards, or cargo bins.

With the disclosed coupling kit-of-parts it is possible to mount a substructure to a primary structure of an aircraft without additional tools. Manufacturing tolerances of the substructure can be compensated. Furthermore, an automated locking of the substructure to the primary structure is possible. The kit-of-parts can be installed/deinstalled in a blind spot with high reliability. In addition, the installation is rotation safe, i.e., even if the fastener rotates, e.g., due to vibration and the like, the installation is prevented from coming loose.

BRIEF DESCRIPTION OF THE DRAWINGS

Embodiments of the invention are described in more detail with reference to the accompanying schematic drawings that are listed below.

DETAILED DESCRIPTION OF THE PREFERRED EMBODIMENTS

Figure 1:
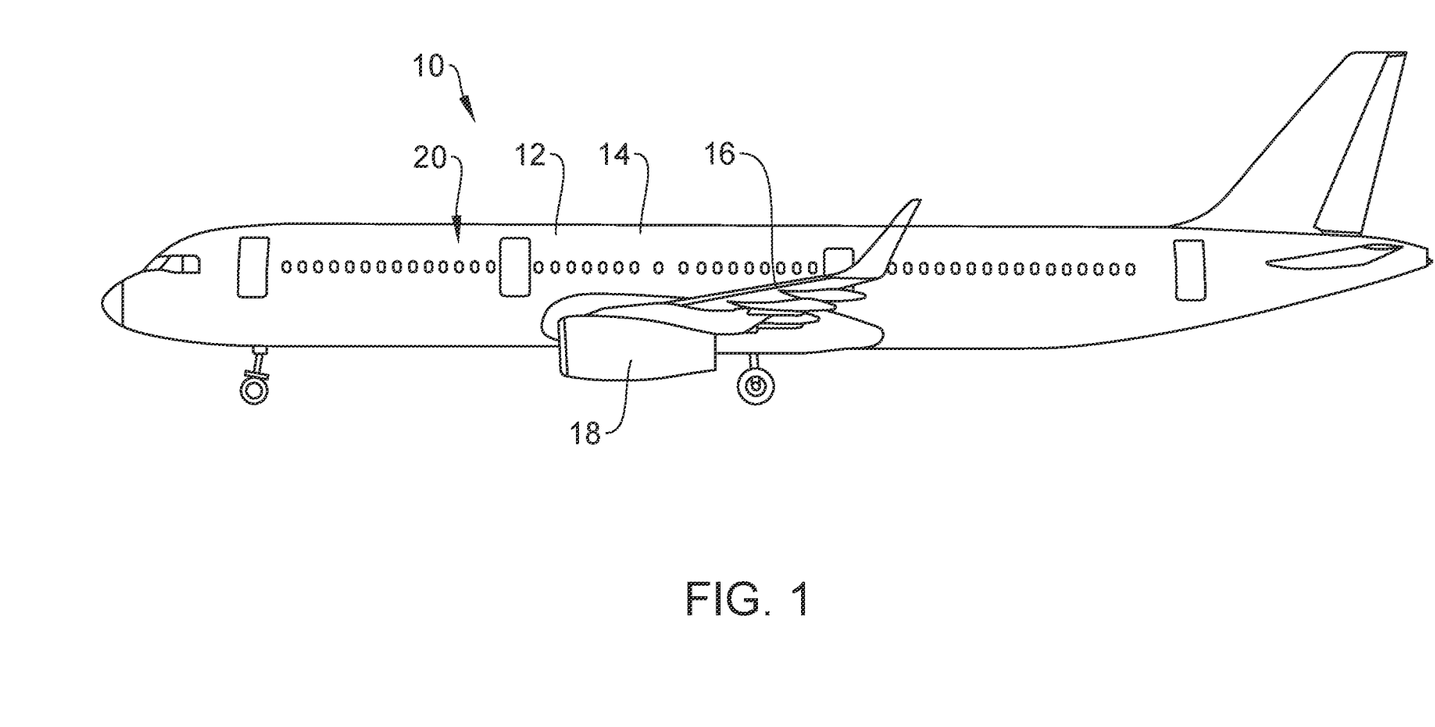
FIG. 1 illustrates an embodiment of an aircraft.

Referring to FIG. 1 an aircraft 10 comprises a primary structure 12, e.g., a fuselage 14. The aircraft 10 further comprises a pair of wings 16 that are attached to the fuselage and that include an engine 18.

The aircraft 10 comprises an aircraft cabin 20 that is arranged inside the fuselage 14.

Figure 2:
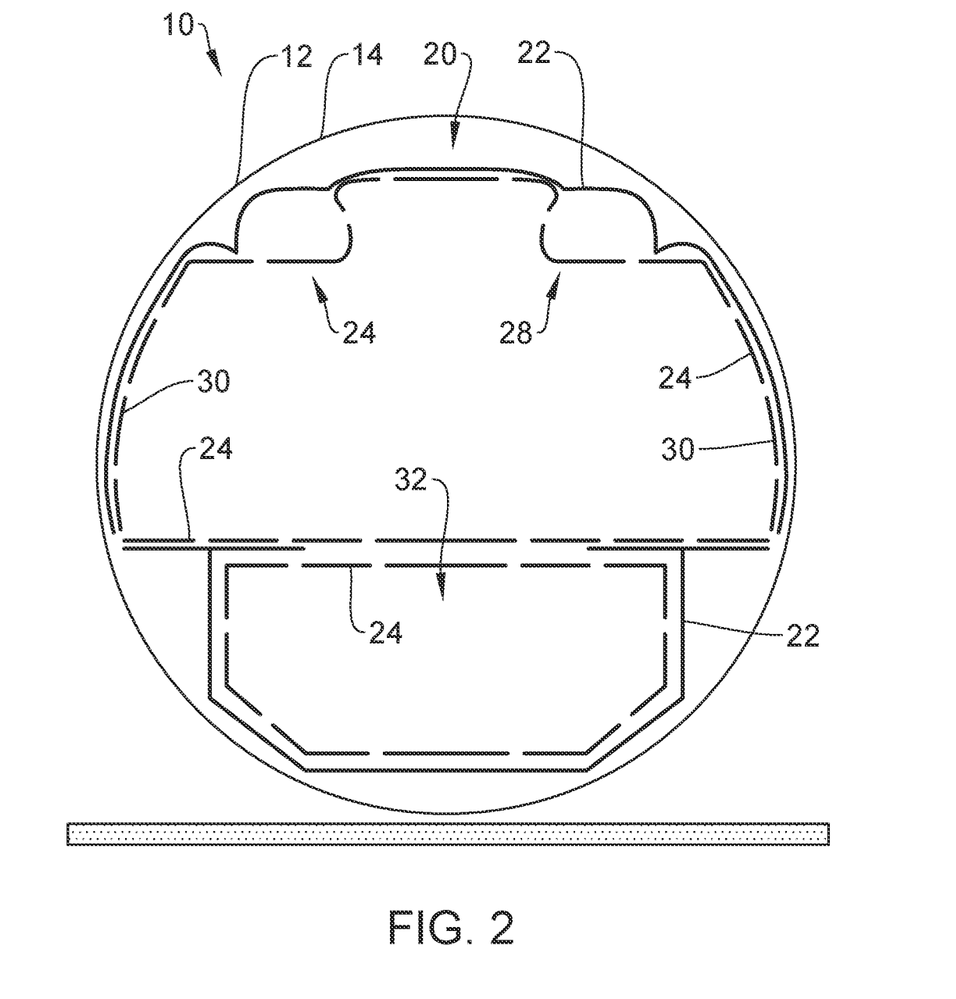
FIG. 2 illustrates a cross-section of the aircraft.

Referring to FIG. 2, the fuselage 14 houses an interior substructure 22. The interior substructure 22 is mounted to the primary structure 12. The interior substructure 22 is configured as an interface between the primary structure 12 and an interior component 24.

The aircraft cabin 20 may include the interior component 24, preferably in the form of a cabin component, such as a cabin crown module 28, interior cabin panels 30, or the like.

The aircraft 10 may include a cargo hold 32 that is typically arranged in a bottom portion of the primary structure 12. The cargo hold 32 may include the interior component 24, preferably in the form of a cargo hold component.

Figure 3:
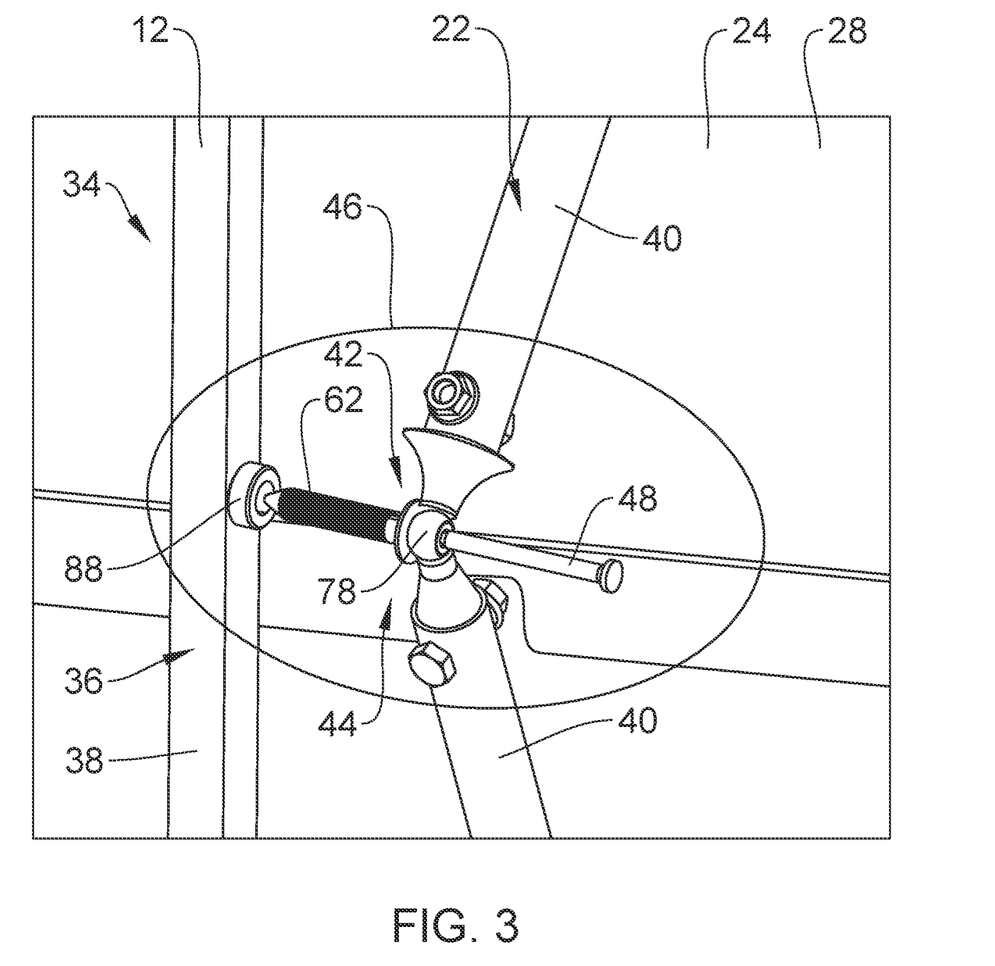
FIG. 3 partially illustrates a mounting arrangement in an unmounted state.
Figure 4:
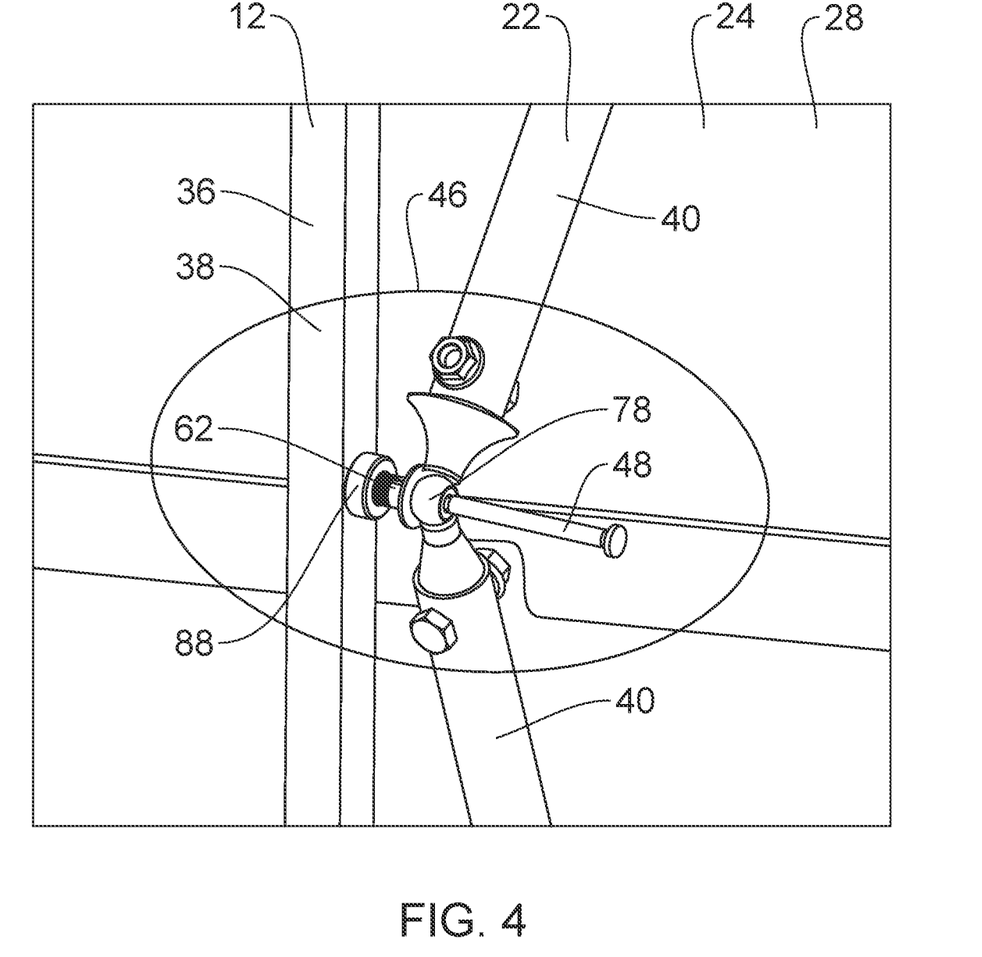
FIG. 4 partially illustrates the mounting arrangement in a ready to be engaged state.
Figure 5:
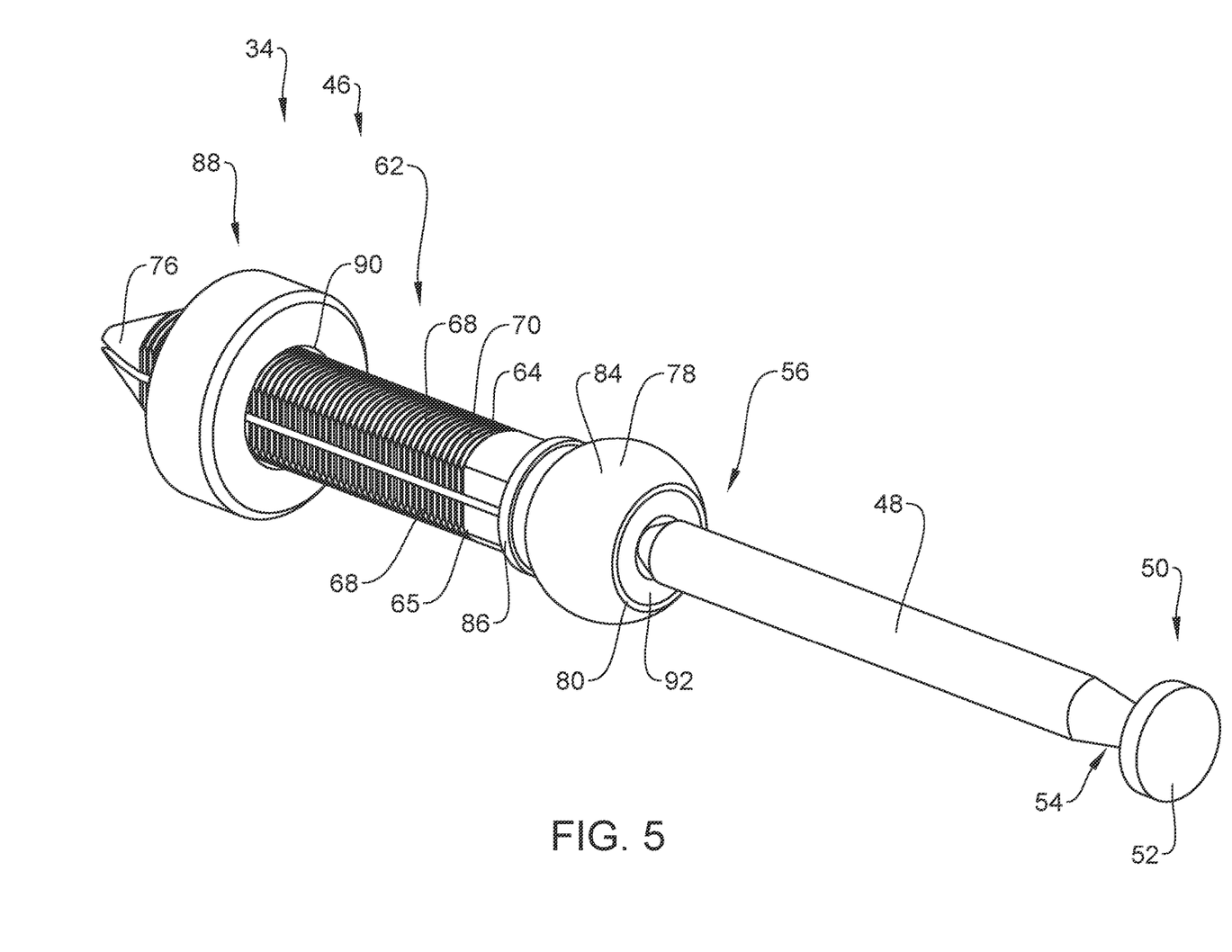
FIG. 5 illustrates an embodiment of a coupling kit-of-parts.
Figure 6:
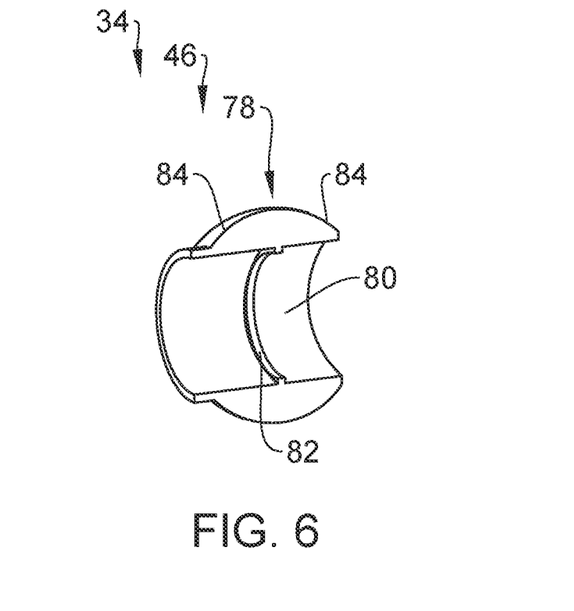
FIG. 6 illustrates a longitudinal section of a support member.

Referring to FIG. 3 and FIG. 4, a mounting arrangement 34 is illustrated in an unmounted state (FIG. 3) and an engaged, but not yet fixed state (FIG. 4). The mounting arrangement 34 includes a primary structure portion 36. The primary structure portion 36 is part of the primary structure 12 and configured as a frame 38, for example. The frame 38 extends along a circumferential direction of the primary structure 12 and preferably supports an aerodynamic skin of the fuselage 14.

The mounting arrangement 34 includes the interior substructure 22. The interior substructure 22 may include a plurality of interior substructure members 40, e.g. struts. Each substructure member 40 has a substructure mounting opening 42. The substructure member 40 is preferably configured such that two or more substructure members 40 may form a spherical joint 44.

The mounting arrangement 34 includes a coupling kit-of-parts 46 that is configured for mounting the substructure members 40 to the primary structure portion 36.

Referring to FIG. 5 through FIG. 8, the coupling kit-of-parts 46 is described in more detail.

The coupling kit-of-parts 46 comprises a locking member 48. The locking member 48 extends in a longitudinal direction. The locking member 48 is preferably formed as a pin member.

The locking member 48 has a locking member head portion 50 that is formed on one end. The locking member head portion 50 preferably includes a plate-like pushing member 52 that can be pushed by a tool or manually by a worker.

The locking member head portion 50 may include a head tapered portion 54. The head tapered portion 54 is preferably arranged adjacent to the pushing member 52. The head tapered portion 54 is formed with the smaller diameter towards the locking member head portion 50.

The locking member 48 may include a locking member end portion 56. The locking member end portion 56 is preferably formed on the opposite end as the locking member head portion 50.

The locking member end portion 56 may include a retaining portion 58. The retaining portion 58 may be formed as a recess in a circumferential surface of the locking member 48.

The locking member end portion 56 may include a tapered end portion 60. The tapered end portion 60 is arranged further away from the locking member head portion 50 than the retaining portion 58.

The coupling kit-of-parts 46 further comprises a mounting member 62. The mounting member 62 is formed from a first member part 64 and a second member part 65.

The first and second member parts 64, 65 are arranged so as to form a locking channel 66 between them. The locking channel 66 is configured to receive the locking member 48.

The first and second member parts 64, 65 are substantially identical to each other. Thus, only the first member part 64 will be described in more detail for sake of brevity.

The first member part 64 extends in a longitudinal direction. The first member part 64 preferably has the shape of one half of a pin-like member that was split along the longitudinal direction.

The first member part 64 preferably includes an engagement surface 68 that is formed on a circumferential surface of the first member part 64 that faces radially outward. The engagement surface 68 may include a plurality of engagement ribs 70.

The first member part 64 can comprise a head portion 72. The locking channel 66 is partially arranged in the head portion 72. The locking channel 66 preferably includes a tapered channel entrance portion 74 that is formed in the head portion 72.

The first member part 64 may have a mounting member end portion 76 that may have a tapered surface.

The coupling kit-of-parts 46 further includes a support member 78. The support member 78 may include a support opening 80. The support member 78 supports the mounting member 62 in a manner that allows the first and second member parts 64, 65 to move in a radial direction. The mounting member 62 is preferably partially inserted in the support opening 80. The support member 78 may include a guiding recess 82 in which the mounting member 62 is supported in a sliding manner, preferably on the head portion 72.

The support member 78 may include a joint portion 84. The joint portion 84 is shaped such that it matches the substructure mounting opening 42 and can form the spherical joint 44.

The coupling kit-of-parts 46 may further comprise an elastic member 86. The elastic member 86 is preferably annularly shaped and may be supported on the mounting member 62 on a circumferential surface thereof. The elastic member 86 is arranged such that the first and second member parts 64, 65 are urged towards each other.

In addition, the elastic member 86 may cooperate with the mounting member 62 such that the mounting member 62 is supported against the support member 78 via the elastic member 86.

The coupling kit-of-parts 46 may include a structure interface bushing 88. The structure interface bushing 88 is affixed to the primary structure portion 36. The structure interface bushing 88 includes a bushing opening 90 that is sized and shaped such that the mounting member 62 can be inserted thereinto. The bushing opening 90 is further sized and shaped to engage the mounting member 62 in a form-fitting manner, specifically via the engagement surface 68.

The coupling kit-of-parts 46 may include a retaining bushing 92. The retaining bushing 92 is inserted into the support member 78, preferably into the support opening 80. The retaining bushing 92 may include a detent member 94 that protrudes from an inner circumferential surface.

Subsequently, a mounting process using the coupling kit-of-parts 46 is described in more detail with reference to FIG. 3 through FIG. 8.

As depicted in FIG. 3, the mounting member 62 is inserted into the mounting opening 42. The support member 78 is positioned in contact with the interior substructure member 40. With reference to FIG. 4, the mounting arrangement 34 is moved in a manner such that the mounting member 62 is inserted into the bushing opening 90. The locking member 48 is partially inserted in the support member 78. Specifically, the retaining portion 58 can engage the detent member 94 such that the locking member 48 can only be removed by overcoming the force exerted by the detent member 94 upon pulling the locking member 48.

Figure 7:
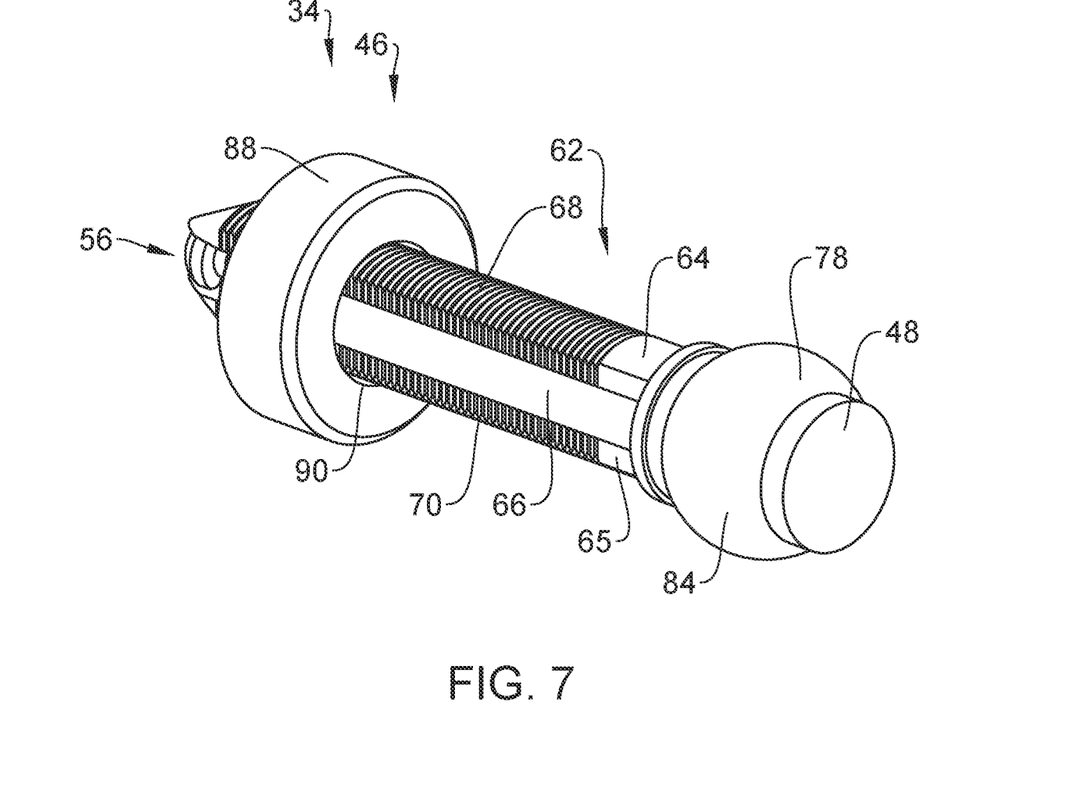
FIG. 7 illustrates the coupling kit-of-parts in a locked state.

Subsequently, the locking member 48 is pushed into the locking channel 66. The locking member 48 engages the channel entrance portion 74 with the tapered end portion 60. Due to the taper the locking channel 66 the first and second member parts 64, 65 are pushed in a radial direction. The head portion 72 slides in the guiding recess 82 radially outward. The engagement surface 68 engages the inner circumferential surface of the bushing opening 90 in a form-fitting manner. The first and second member parts 64, 65 are supported by the locking member 48 such that a movement of the first and second member parts 64, 65 radially inward is blocked. The locking member head portion 50 engages the detent member 94 such that the detent member 94 engages the head tapered portion 54. The substructure 22 is now affixed to the primary structure portion 36. Subsequently, the locking member 48 can be pulled from this position by overcoming the force exerted by the detent member 94 onto the locking member 48.

Figure 8:
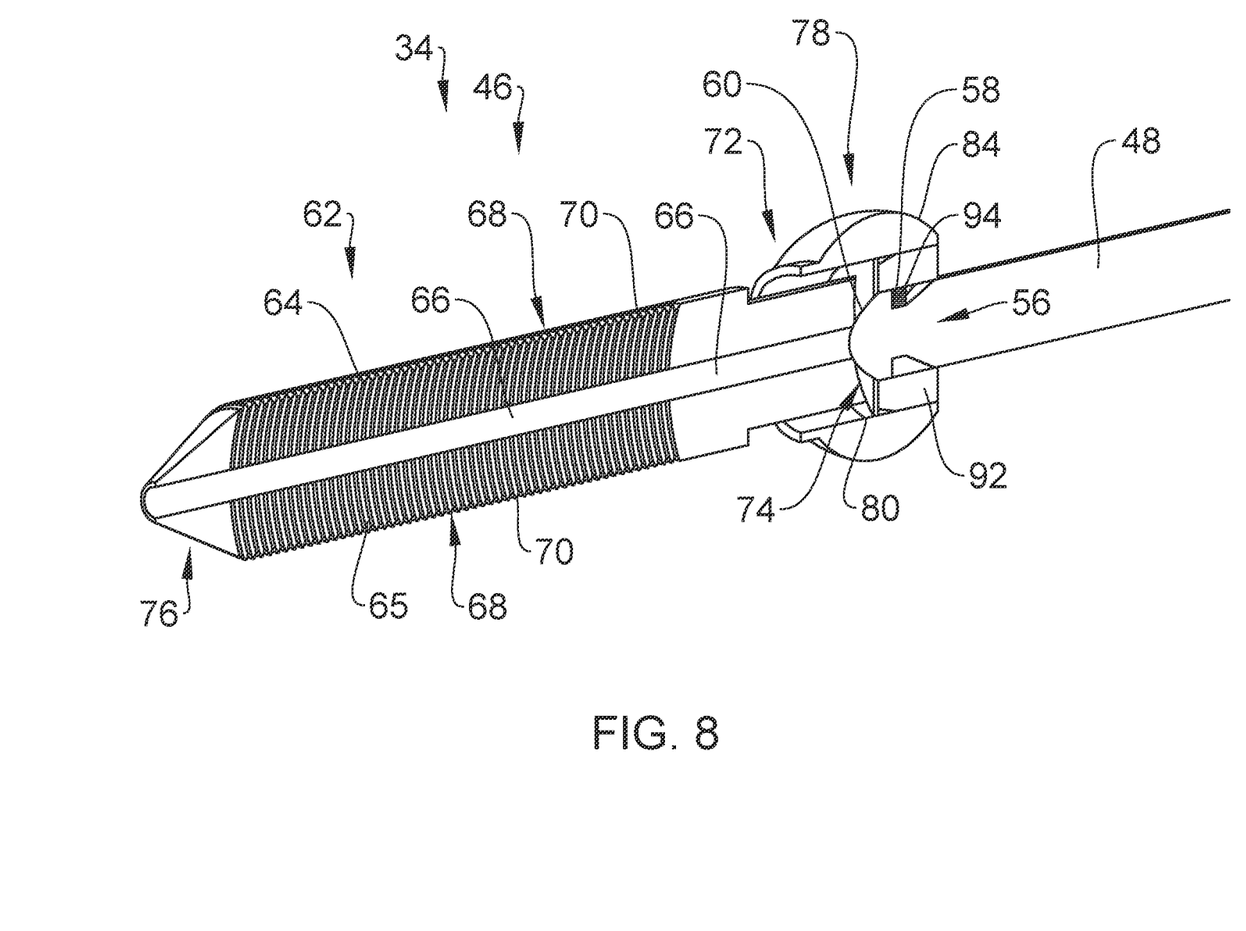
FIG. 8 illustrates a longitudinal section of the coupling kit-of-parts in an unlocked state.

When the locking member 48 is removed from the locking channel 66, the elastic member 86 urges the first and second member parts 64, 65 in a radial direction inward such that the mounting member 62 is disengaged from the structure interface bushing 88. Thus, the mounting member 62 can be removed from the bushing opening 90 and the substructure 22 is loosened from the primary structure portion 36.

Figure 9:
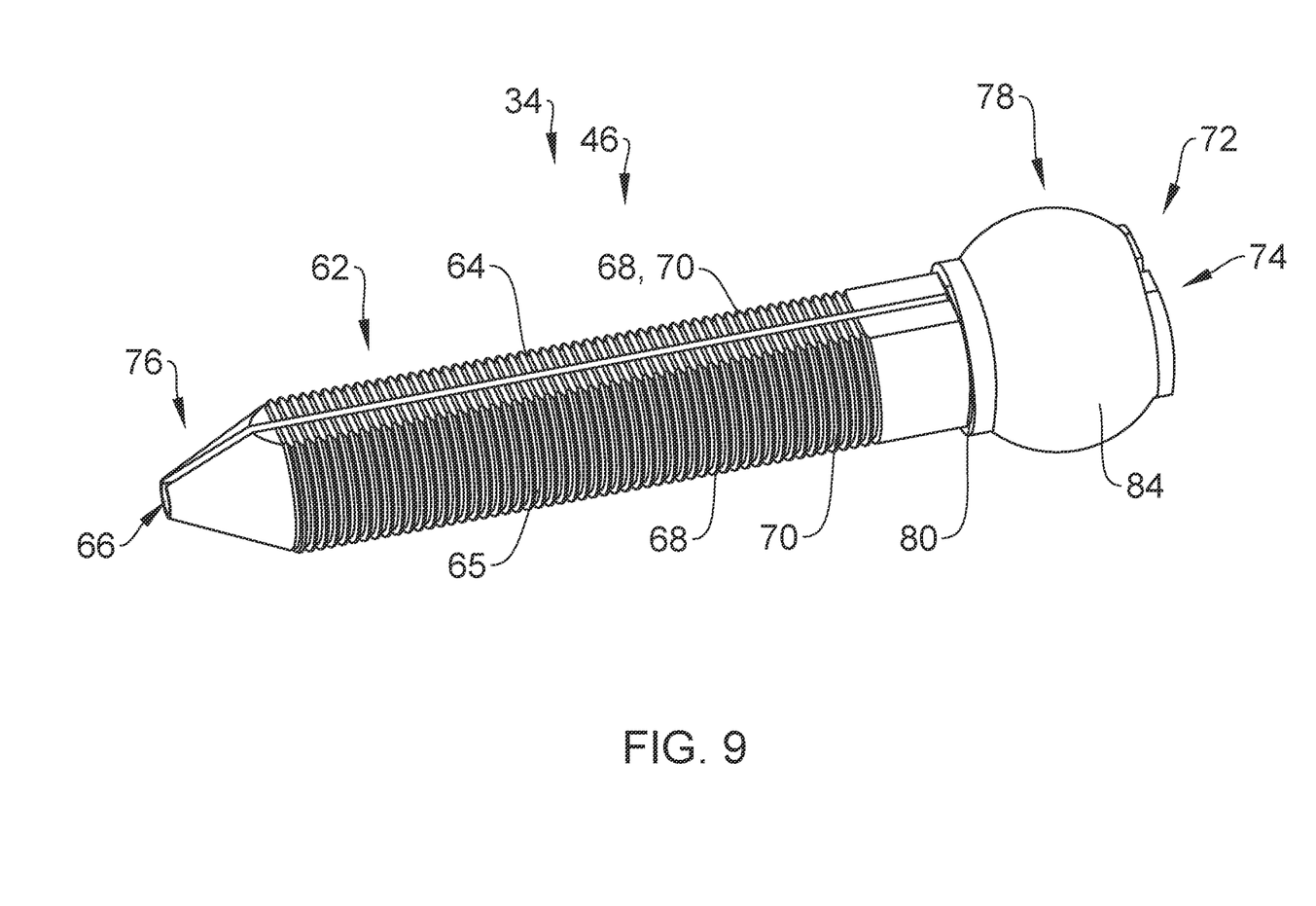
FIG. 9 illustrates another embodiment of a coupling kit-of-parts, depicted without locking member.

Referring to FIG. 9 another embodiment of the mounting member 62 and the support member 78 are described in more detail, but only insofar as they differ from the previously described embodiment.

Here, the head portion 72 is formed such that it is supported along the longitudinal direction of the mounting member 62 on an outer surface of the support member 78. In this configuration no retaining bushing 92 is required.

The elastic member 86 is arranged on the opposite side of the support member 78 in order to prevent the mounting member 62 from being removed from the support member without resistance.

In order to improve automation in the mounting of interior components 24 to an aircraft primary structure 12, the invention proposes a coupling kit-of-parts 46 for mounting an interior substructure 22 to a primary structure 12 of an aircraft 10. The kit 46 includes a locking member 48 and a mounting member 62. When the locking member 48 is inserted into the mounting member 62, a first member part 64 and a second member part 65 are pushed radially outward to engage the primary structure 12 in a form-fitting manner. When the locking member 48 is removed, the first and second member parts 64, 65 are urged radially inward thereby disengaging from the primary structure 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 primary structure
14 fuselage
16 wing
18 engine
20 aircraft cabin
22 substructure
24 interior component
28 cabin crown module
30 cabin panels
32 cargo hold
34 mounting arrangement
36 primary structure portion
38 frame
40 interior substructure member
42 mounting opening
44 spherical joint
46 coupling kit-of-parts
48 locking member
50 locking member head portion
52 pushing member
54 head tapered portion
56 locking member end portion
58 retaining portion
60 tapered end portion
62 mounting member
64 first member part
65 second member part
66 locking channel
68 engagement surface
70 engagement rib
72 head portion
74 channel entrance portion
76 mounting member end portion
78 support member
80 support opening
82 guiding recess
84 joint portion
86 elastic member
88 structure interface bushing
90 bushing opening
92 retaining bushing
94 detent member

The invention claimed is:

1. A coupling kit-of-parts for a mounting arrangement that is configured for mounting an interior substructure to a primary structure of an aircraft, the kit-of-parts comprising:
 a locking member; and
 a mounting member including a first member part and a second member part that are movably supported by a common support member, wherein the first and second member parts form a locking channel therebetween that is configured to receive the locking member, wherein the mounting member is configured such that, when the locking member is inserted into the locking channel, the first and second member parts are pushed radially outward by the locking member.

2. The kit-of-parts according to claim 1 further comprising an elastic member that is configured to urge the first and second member parts radially inward along a radial direction such that, when the locking member is removed from the locking channel, the first and second member parts are pushed radially inward by the elastic member.

3. The kit-of-parts according to claim 1, wherein the support member includes a guiding recess that is configured to guide the first and second member parts along a radial direction.

4. The kit-of-parts according to claim 1, wherein at least one of the first member part or the second member part include a head portion that engages the support member in a sliding manner.

5. The kit-of parts according to claim 4, wherein the head portion engages the guiding recess of the support member in a sliding manner.

6. The kit-of-parts according to claim 1, wherein at least one of the first member part or the second member part include an engagement surface that is configured to engage a structure interface bushing in a form-fitting manner.

7. The kit-of-parts according to claim 1,
wherein the locking channel comprises a tapered channel entrance portion and a channel portion that matches the locking member,
wherein, when the locking member is inserted past the channel entrance portion, the first and second member parts are radially moved apart, and the channel portion is supported on the locking member.

8. The kit-of-parts according to claim 1, wherein at least one of the first member part or the second member part include a mounting member end portion that comprises an outward facing tapered surface.

9. The kit-of-parts according to claim 1, further comprising a retaining bushing that is inserted in the support member and retains the locking member in a manner that requires overcoming a mechanical resistance, when removing the locking member from the support member.

10. The kit-of-parts according to claim 1, further comprising a structure interface bushing that is configured to get engaged by the radially pushed first and second member parts, when the locking member is inserted in the locking channel, such that the mounting member is affixed to the structure interface bushing.

11. A mounting arrangement for mounting an interior substructure to a primary structure of an aircraft, the arrangement comprising:
a primary structure portion;
an interior substructure member having a substructure mounting opening configured to mount the interior substructure to the primary structure portion;
a coupling kit-of-parts according to claim 10,
wherein the structure interface bushing is affixed to the primary structure portion, wherein the mounting member is inserted in the mounting opening such that the support member is arranged in a manner that prevents the interior substructure from being removed from the mounting member.

12. The mounting arrangement according to claim 11, wherein an elastic member is arranged between the structure interface bushing and the support member.

13. The mounting arrangement according to claim 11, wherein at least one of the first member part or the second member part include an engagement surface that engages the structure interface bushing in a form-fitting manner, when the locking member is inserted in the locking channel.

14. The mounting arrangement according to claim 11, wherein at least one of the first member part or the second member part include a shank portion that is at least partially inserted in the structure interface bushing.

15. An aircraft cabin or a cargo hold comprising an interior component, an interior substructure, and a mounting arrangement according to claim 11,
wherein the interior substructure member is part of the interior substructure, and
wherein the interior component is mounted to the interior substructure and the interior substructure is mounted to the primary structure portion by the mounting arrangement.

16. An aircraft comprising an aircraft cabin according to claim 15.

* * * * *